United States Patent
Nelson

(10) Patent No.: US 11,862,032 B1
(45) Date of Patent: Jan. 2, 2024

(54) DEVICE AND METHOD FOR DISPLAYING MUSICAL CHORDS

(71) Applicant: Wade Nelson, Los Osos, CA (US)

(72) Inventor: Wade Nelson, Los Osos, CA (US)

(*) Notice: Subject to any disclaimer, the term of this patent is extended or adjusted under 35 U.S.C. 154(b) by 0 days.

(21) Appl. No.: 18/243,279

(22) Filed: Sep. 7, 2023

Related U.S. Application Data

(60) Provisional application No. 63/419,093, filed on Oct. 25, 2022.

(51) Int. Cl.
*G09B 15/00* (2006.01)
*G10G 1/02* (2006.01)

(52) U.S. Cl.
CPC .............. *G09B 15/004* (2013.01); *G10G 1/02* (2013.01)

(58) Field of Classification Search
CPC .................. G09B 15/004; G10G 1/02
See application file for complete search history.

(56) References Cited

U.S. PATENT DOCUMENTS

| | | | |
|---|---|---|---|
| 266,321 A | 10/1882 | Scribner | |
| 422,964 A | 3/1890 | McTammany | |
| 2,001,191 A | 5/1935 | Golden | |
| 2,824,479 A | 2/1958 | De Rosa | |
| 3,245,303 A | 4/1966 | Patt | |
| 3,668,967 A * | 6/1972 | Malis | G09B 15/006 84/471 SR |
| 3,691,895 A | 9/1972 | Nessler | |
| 3,728,931 A | 4/1973 | Leonard | |
| 3,731,581 A | 5/1973 | Griffin | |
| 3,748,947 A * | 7/1973 | Freiheit | G09B 15/006 84/471 SR |
| 3,758,698 A | 9/1973 | Matyas | |
| 3,771,409 A | 11/1973 | Rickey | |
| 3,785,240 A | 1/1974 | Hill | |
| 3,894,465 A * | 7/1975 | Simmons | G09B 15/006 84/485 R |
| 4,069,735 A | 1/1978 | Bertram | |
| 4,069,737 A * | 1/1978 | Andersson | G10G 1/00 84/485 SR |
| 4,175,468 A | 11/1979 | Whitlock | |
| 4,237,766 A | 12/1980 | Marshall | |
| 4,503,748 A | 3/1985 | Barber, Jr. | |
| 4,960,029 A * | 10/1990 | Nelson | G09B 15/026 235/89 R |
| 4,969,383 A * | 11/1990 | Bezeau, Jr. | G10G 1/02 84/485 SR |
| 5,029,507 A * | 7/1991 | Bezeau, Jr. | G10G 1/02 84/485 SR |
| 5,386,757 A * | 2/1995 | Derrick | G09B 15/008 84/485 SR |
| 5,410,940 A * | 5/1995 | Havas | G10G 1/02 84/485 SR |

(Continued)

*Primary Examiner* — Robert W Horn
(74) *Attorney, Agent, or Firm* — TMB Law; Timothy M. Brown

(57) ABSTRACT

The invention provides a device and method for displaying chords in a musical scale based upon one or more selected root notes. The device includes planar members representing a fretboard of a stringed instrument and fingering positions for playing chords in a selected root note in a selected musical scale. The planar members are adapted to be connected to one another and permit multiple chords in multiple root notes to be displayed simultaneously in an easy to understand format.

23 Claims, 3 Drawing Sheets

(56) References Cited

U.S. PATENT DOCUMENTS

| | | | |
|---|---|---|---|
| 6,288,315 B1* | 9/2001 | Bennett | G09B 15/004 |
| | | | 84/471 SR |
| 7,084,340 B2* | 8/2006 | Tan | G09B 15/06 |
| | | | 84/477 R |
| 7,184,701 B2 | 2/2007 | Heslip | |
| 7,332,665 B2 | 2/2008 | Haney | |
| 7,579,542 B2* | 8/2009 | Pearlman | G09B 15/026 |
| | | | 84/471 SR |
| 8,378,195 B2 | 2/2013 | Willoughby | |
| 8,884,147 B1 | 11/2014 | Stambaugh | |
| 10,121,458 B1* | 11/2018 | Giuriati | G10G 1/02 |
| 2009/0025536 A1 | 1/2009 | Olson | |

* cited by examiner

DEVICE AND METHOD FOR DISPLAYING MUSICAL CHORDS

CROSS-REFERENCE TO RELATED APPLICATIONS

This application claims the benefit of provisional application No. 63/419,093 filed Oct. 25, 2022, the entire contents of which are incorporated herein by reference for all purposes.

FIELD OF THE INVENTION

The invention generally relates to playing music. More particularly, the invention relates to devices and methods for displaying musical chords.

BACKGROUND

The prior devices for displaying and teaching chords for a stringed instrument, such as a guitar, utilize movable slides or cards that fit over or within a simulated stringboard. Either the slides or cards, or simulated stringboard, are provided with holes to indicate the strings held and the finger to be used for playing a given note. In these devices, because the slides or cards are located over or behind the stringboard, portions of the simulated stringboard or chords are hidden behind the movable slides or cards, and the finger designations are not visible. Moreover, the display of the playable notes is limited to a single chord in a single key or root note.

Accordingly, what is needed is a device for displaying the fingering positions for multiple chords in one or more root notes simultaneously.

SUMMARY OF THE INVENTION

The invention provides a device and method that simultaneously displays the fingering positions for playing multiple chords in a musical scale. The device includes a first planar member and one or more second planar members. The first planar member has indicia that represent the frets of a fretboard of a stringed instrument and a listing of selectable notes. The second planar member also has indicia that represent the frets of the fretboard, and further includes a root note marker, indicia that represent the strings of a stringed instrument, and a plurality of fingering positions for playing notes and chords in a selected musical scale.

In practice, the user selects a second planar member which displays the notes and fingering positions for a desired musical scale. The selected second planar member is placed next to the first planar member such that the root note marker identifies, or selects, a note from the selectable notes on the first planar member. This selected note designates the root note that is desired for playing one or more chords in the selected musical scale. With the second planar member and the first planar member so aligned, the second planar member displays the fretboard fingering positions for playing chords in the selected musical scale based on the selected root note.

The first planar member and second planar member can be connected to one another by notches. The root note maker can be located on one or more of the notches, and the selectable notes on the first planar member are individually aligned with a notch that is adapted to mate with the notch of the root note marker. This design can permit the first planar member and the second planar member to lock together such that the root note marker remains aligned with a desired root note. Locking the first planar member to the second planar member can also keep the frets on the first planar member and the frets on the second planar member aligned.

Additional second planar members can be fixed to the second planar member that is attached to the first planar member thereby displaying and providing an indication of fingering positions for playing additional chords in a root note that is selected from the selectable notes on the first planar member.

DETAILED DESCRIPTION

Figure 1:
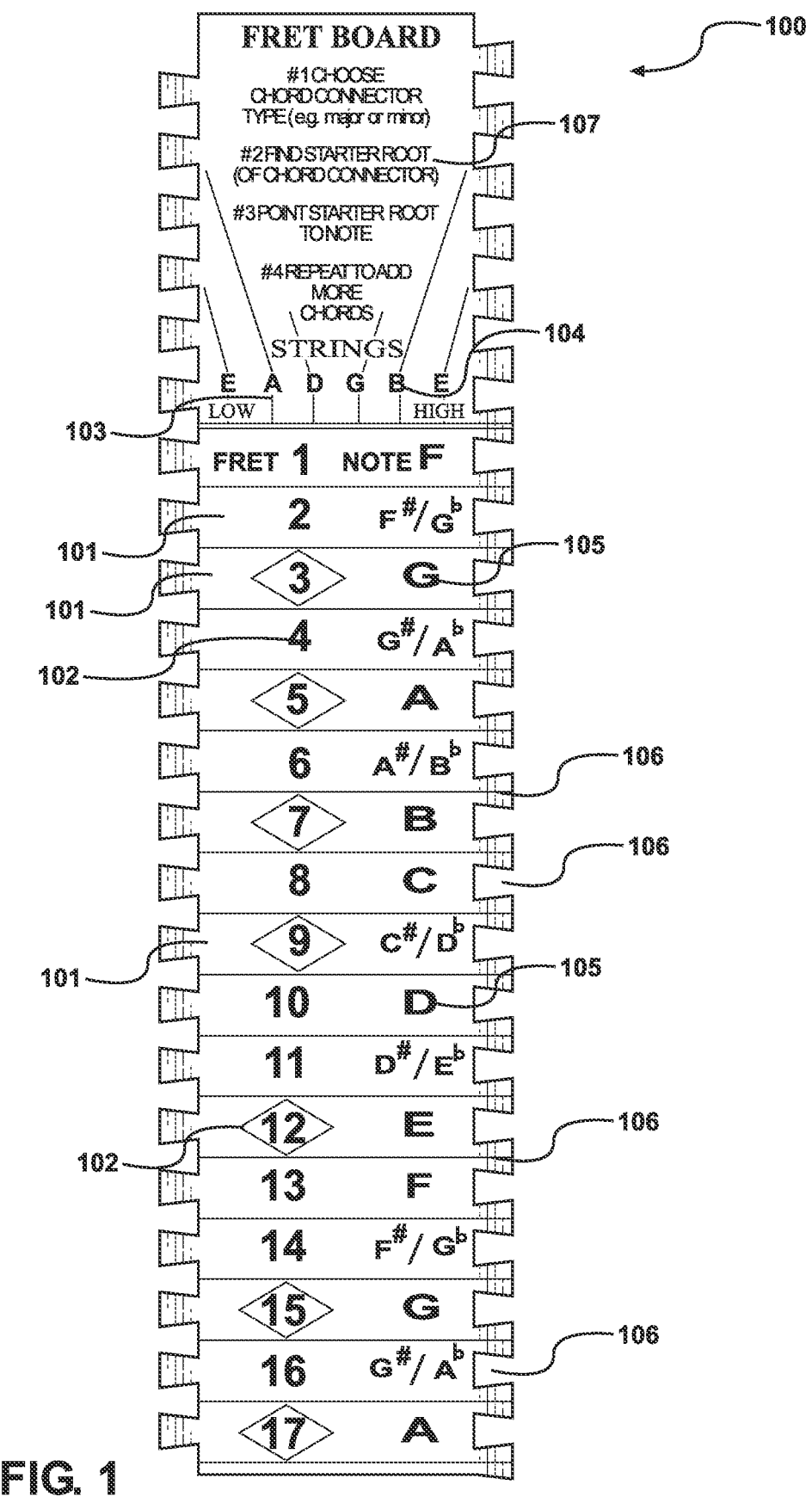
FIG. 1 shows an embodiment of the first planar member.

FIG. 1 shows an embodiment of a first planar member for use with the invention, wherein first planar member 100 includes frets 101 which are representative of the frets of a stringed instrument. First planar member 100 can include fret numbering 102 to indicate the numbering of frets 101 on the fretboard of a stringed instrument. First planar member 100 can further include string indicia 103 which represent the strings of a stringed instrument, and string notes 104 which represent the notes of the strings of a stringed instrument. While first planar member 100 simulates a stringed instrument having 17 frets and six strings, it will be appreciated that the first planar member can have indicia that represent different numbers of frets and strings. Thus, the invention is not limited to use with stringed instruments having only 17 frets and six strings. First planar member 100 can include frets, fret numbering, strings, and string notes that are representative of an instrument selected from, but not limited to, a guitar, banjo, ukulele, or mandolin.

First planar member 100 includes selectable notes 105. First planar member can have notches 106 which are adapted to mate with notches 106 on second planar member 200 to permit first planar member 100 to be detachably connected to second planar member 200. Notches 106 on first planar member 100 are preferably aligned with individual notes listed in selectable notes 105. First planar member 100 can have instructions 107 for instructing a user on how to use the device to display one or more chords for playing notes in a musical scale. In some non-limiting embodiments of the invention, notches 106 are omitted and/or replaced with a means for connecting first planar member 100 and one or more second planar members 200 to one another. Some non-limiting connecting means include hook and loop fasteners (e.g. Velcro™) and magnets.

Figure 2:
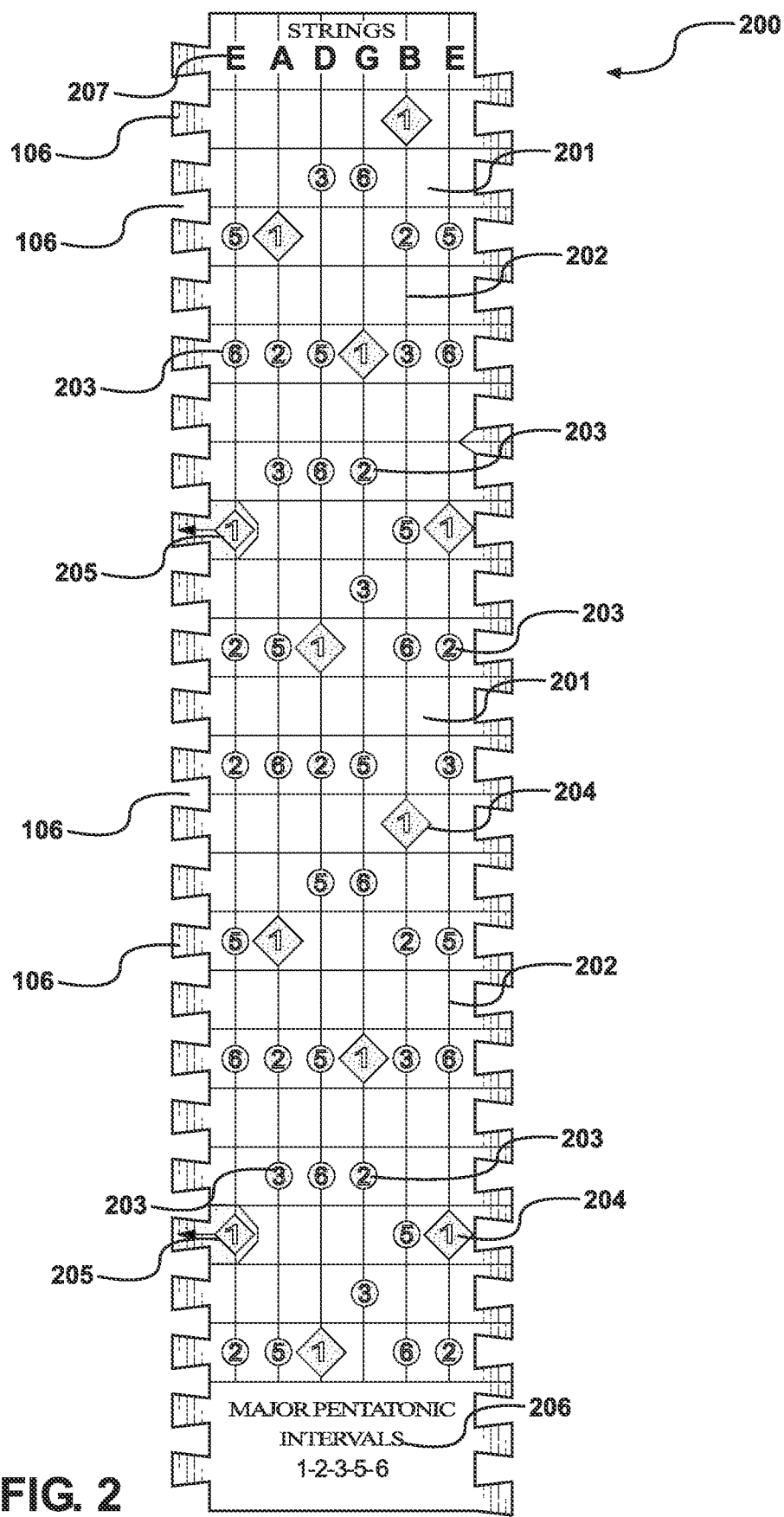
FIG. 2 shows an embodiment of the second planar member.

FIG. 2 shows an embodiment for a second planar member for use with the invention. Second planar member 200 has frets 201 which represent the frets of a stringed instrument. Second planar member 200 can further include string indicia 202 which represent the strings of a stringed instrument. Second planar member includes notes 203 which represent fingering positions for playing notes in a musical scale. Notes 203 can include one or more root note indicators 204 which represent the root notes of chords in a musical scale. Notes 203 can include indicia that represent the intervals for playing the notes in the musical scale. In the example provided in FIG. 2, notes 203 indicate the intervals 1-2-3-5-6 which correspond to the intervals of the major pentatonic scale.

Second planar member 200 includes one or more root note markers 205. Second planar member can include notches 106 which are adapted mate with notches 106 on first planar member 100 so as to permit first planar member 100 to detachably connect to second planar member 200. Root note markers 205 can be aligned with a notch from notches 106. Second planar member 200 can include scale indicator 206 to signify that notes 203 correspond to fingering positions for a given musical scale. Scale indicator 206 can list any scale playable by a stringed instrument. Scale indicator 206, and corresponding notes 203, can be, for example, a scale selected from diatonic, a major scale, a minor scale, pentatonic, Ionian, Dorian, Phyrigian, Lydian, Mixolydian, Aeolian, Locrian, and dominant 7, minor 7, and blues. Second planar member 200 can include string notes 207 for indicating the notes of the strings represented by string indicia 202.

First planar member 100 and second planar member can be made from any suitable material for practicing the device and method disclosed herein. Suitable materials include, but are not limited to, plastic, wood, or bamboo.

Figure 3:
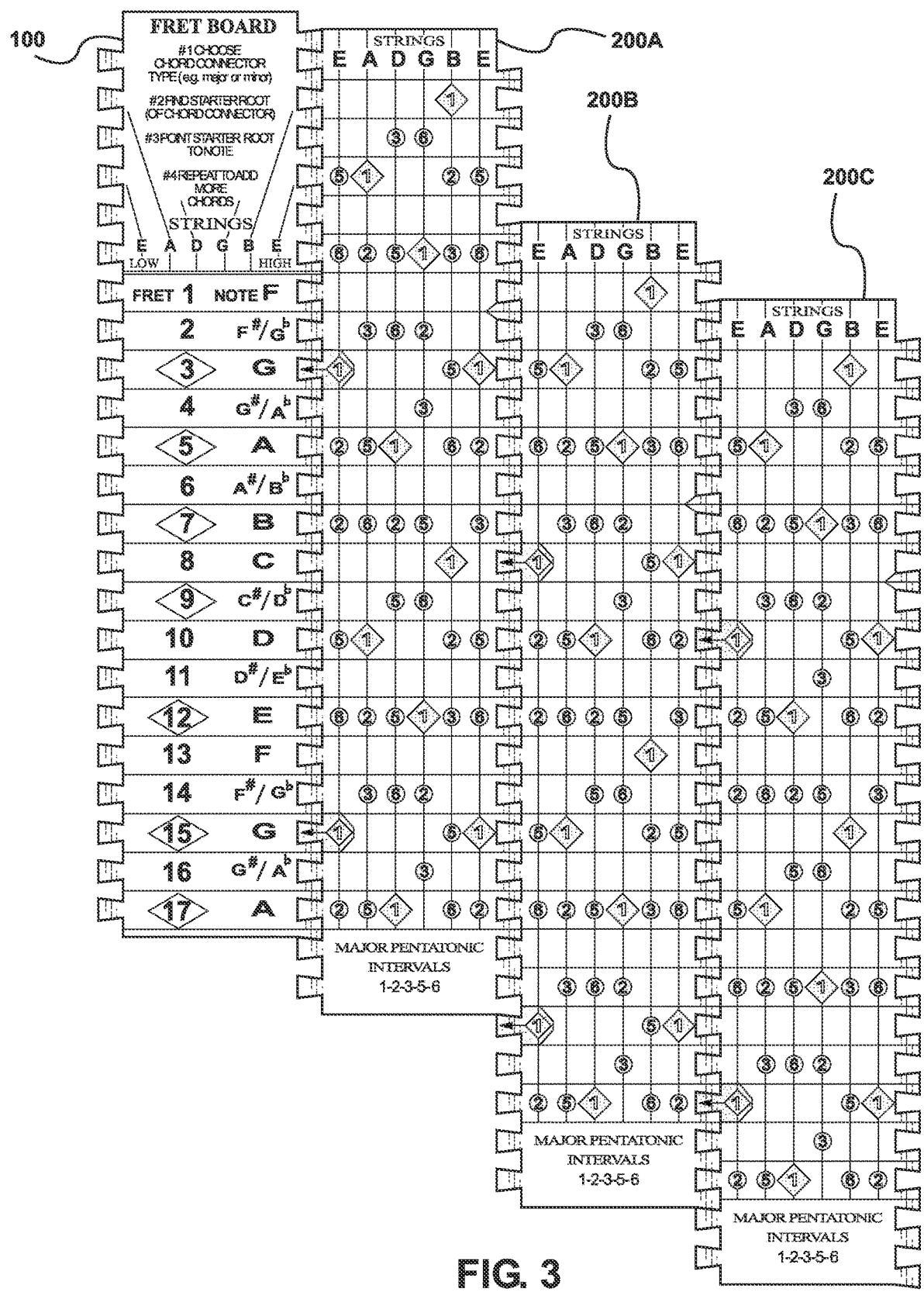
FIG. 3 shows an arrangement of a first planar member in connection with multiple second planar members.

FIG. 3 shows an embodiment of the inventive device in use. FIG. 3 shows first planar member 100 connected to second planar member 200A, which is connected to second planar member 200B, which is connected to second planar member 200C. Second planar members 200A, 200B, and 200C have notes 203 which represent fingering positions for playing notes in the major pentatonic scale.

The device depicted in FIG. 3 has first planar member 100 connected to second planar member 200A, wherein root note marker 205 is selecting the note of G from selectable notes 105 on first planar member 100. Thus, second planar member 200A displays notes 203 which represent the fingering positions on the fretboard of a stringed instrument for playing a first one or more chords in the note of G in the major pentatonic scale. As shown, second planar member 200B has root note marker 205 selecting the note of C from selectable notes 105 such that second planar member 200B displays notes 203 for fingering positions for playing a second one or more chords in the note of C in the major pentatonic scale. Second planar member 200C has root note marker 205 selecting the note of D from selectable notes 105 such that second planar member 200C displays notes 203 for fingering positions for playing a third one or more chords in the note of D in the major pentatonic scale. Thus, the arrangement of the inventive device shown in FIG. 3 simultaneously displays chords for playing the notes G-C-D in the major pentatonic scale. Additionally, notes 203 on second planar members 200A, 200B, and 200C display the intervals for the fingering positions for playing the notes in the chords.

While FIG. 3 shows first planar member 100 connected to second planar members 200A, 200B, and 200C, it will be appreciated that first planar member 100 can be connected to just a single second planar member 200, or two or more second planar members 200, depending on the number of root notes that are desired for chords in a musical scale.

In some embodiments, the invention provides a method of displaying chords in a selected musical scale for playing by a stringed instrument. The invention can be practiced by providing first planar member 100 and selecting at least one second planar member 200 that displays fingering positions for playing chords in a desired musical key. Second planar member 200 can be selected based on the use of scale indicator 206 which indicates the musical scale to which second planar member 200 relates. The selected second planar member 200 is then connected to first planar member 100 such that root note marker 205 selects a desired root note from selectable notes 105 on first planar member 100. Connecting second planar member 200 to first planar member 100 aligns frets 101 on first planar member 100 with frets 201 on second planar member 200. With root note marker 205 aligned with a selected root note from selectable notes 105, notes 203 of second planar member 200 display the fingering positions for playing one or more chords in the desired musical scale based on the selected root note. Notes 203 can include indicia for the intervals for the notes and fingering positions. For example, if second planar member 200 displays notes for the major pentatonic scale, notes 203 can include indicia for the 1-2-3-5-6 intervals for the fingering positions.

The invention claimed is:

1. A device for displaying chords for a stringed instrument, comprising:
    a) a first planar member having (i) first indicia representative of frets on a fretboard of a stringed instrument, and (ii) second indicia representative of a plurality of notes; and
    b) one or more second planar members having (iii) a marker adapted to select a root note from said plurality of notes, (iv) third indicia representative of strings of said stringed instrument, (v) fourth indicia representative of said frets, and (vi) fifth indicia representative of finger positions for playing one or more chords in a scale by said strings, wherein selecting a root note from said plurality of notes by said marker provides an arrangement for said finger positions on said fretboard for playing one or more chords in the root note that is selected by said marker;
    wherein said first planar member and said one or more second planar members are adapted to be displayed side-by-side.

2. The device of claim 1, wherein said first indicia includes numbers representative of numbering of said frets on said fretboard.

3. The device of claim 1, wherein said first planar member and said one or more second planar members are adapted to connect to one another, wherein connecting said first planar member to said one or more second planar members align said frets of said first indicia with said frets of said fourth indicia.

4. The device of claim 1, wherein said first planar member and said one or more second planar members are adapted to connect to one another by notches, one or more hook and loop fasteners, magnets, or a combination thereof.

5. The device of claim 1, wherein said first planar member and said one or more second planar members are adapted to connect to one another by notches, and said marker is located on one or more of said notches.

6. The device of claim 1, wherein said fifth indicia are representative of finger positions for playing a plurality of different chords in said scale by said strings.

7. The device of claim 1, wherein said fifth indicia include numbering to indicate a sequence of said fingering positions for playing notes for said one or more chords.

8. The device of claim 1, wherein said fifth indicia include one or more indicia indicative of at least one root note in said scale.

9. The device of claim 1, wherein said scale includes a scale selected from diatonic scale, major scale, minor scale, pentatonic, Ionian, Dorian, Phyrigian, Lydian, Mixolydian, Aeolian, Locrian, dominant 7, minor 7, and blues.

10. The device of claim 1, wherein said device comprises a plurality of said second planar members.

11. The device of claim 10, wherein said plurality of said second planar members have fifth indicia that are representative of finger positions for playing one or more chords in the same or different scales by said strings.

12. The device of claim 1, wherein said stringed instrument is a guitar, banjo, ukulele, or mandolin.

13. A method of displaying chords for a stringed instrument, comprising:
   providing a device comprising:
      a) a first planar member having (i) first indicia representative of frets on a fretboard of a stringed instrument, and (ii) second indicia representative of a plurality of notes; and
      b) a second planar member having (iii) a marker adapted to select a root note from said plurality of notes, (iv) third indicia representative of strings of said stringed instrument, (v) fourth indicia representative of said frets, and (vi) fifth indicia representative of finger positions for playing one or more chords in a scale by said strings;
   placing said marker next to a note from said plurality of notes thereby selecting a first root note from said plurality of notes;
   wherein selecting said first root note causes said fifth indicia to display an arrangement of finger positions on said fretboard for playing a first one or more chords in said first root note in said scale by said strings.

14. The method of claim 13, wherein placing said marker next to a note from said plurality of notes causes said first planar member and said second planar member to be displayed side-by-side.

15. The method of claim 13, wherein placing said marker next to a note from said plurality of notes comprises connecting said first planar member to said one or more second planar members, wherein connecting said first planar member to said one or more second planar members align said frets of said first indicia with said frets of said fourth indicia.

16. The method of claim 15, wherein said first planar member and said one or more second planar members are connected to one another by notches, one or more hook and loop fasteners, magnets, or a combination thereof.

17. The method of claim 15, wherein placing said marker next to a note from said plurality of notes comprises connecting said first planar member to said one or more second planar members by notches, and said marker is located on one or more of said notches.

18. The method of claim 13, wherein selecting said first root note causes said fifth indicia to display an arrangement of finger positions on said fretboard for playing a plurality of chords in said root note in said scale by said strings.

19. The method of claim 13, wherein said fifth indicia include numbering to indicate a sequence of said fingering positions for playing notes for said one or more chords.

20. The method of claim 13, wherein said fifth indicia include one or more indicia indicative of said first root note in said scale.

21. The method of claim 13, wherein said scale includes a scale selected from diatonic scale, major scale, minor scale, pentatonic, Ionian, Dorian, Phyrigian, Lydian, Mixolydian, Aeolian, Locrian, dominant 7, minor 7, and blues .

22. The method of claim 13, further comprising providing at least one additional second planar member and repeating said placing step thereby selecting at least one second root note, wherein selecting said second root note causes said fifth indicia on said at least one additional second planar member to display an arrangement of finger positions on said fretboard for playing a second one or more chords in said second root note in said scale by said strings.

23. The method of claim 15, wherein said stringed instrument is a guitar, banjo, ukulele, or mandolin.

* * * * *